Patented July 21, 1931

1,815,790

UNITED STATES PATENT OFFICE

KARL MARX, HERMANN BEHNCKE, AND HANS ZOBEL, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF FINELY SUBDIVIDED METALS

No Drawing. Application filed April 14, 1928, Serial No. 270,149, and in Germany July 11, 1927.

The invention relates to a process for separating metals, particularly metals suitable for catalytic purposes from their reducible compounds by reduction with hydrogen or gases containing hydrogen, and is based on the observation that metal oxides, hydroxides or reducible salts can be reduced smoothly and simply at comparatively low temperatures if care be taken that there is present a small proportion of a suitable catalyst. It is apparently immaterial whether this catalyst has been obtained at a low temperature or at a high temperature and whether it is a different metal or a mixture of metals. The reduction may be carried out in similar manner, whether the subdivided metal compound is dry or contained in a suspension medium. Instead of hydrogen itself gases containing hydrogen may be used. Metals obtained in this manner have the outstanding property that they accelerate reactions even at low temperatures. In many cases it is advantageous to precipitate the metal on a suitable carrier.

The following examples illustrate the invention, the parts being by weight:—

*Example 1.*—140 parts of a mixture of kieselguhr with copper carbonate which has been precipitated from a solution of copper salt by means of sodium carbonate, the mixture containing 21.2 parts of copper, are mixed with 2 parts of finely subdivided nickel and heated at about 100° C. in an autoclave having a stirrer under a pressure of hydrogen of about 40 atmospheres. The finely subdivided, easily oxidisable copper is preferably preserved in water or another suspension medium.

*Example 2.*—200 parts of a mixture of kieselguhr and nickel carbonate containing 40.8 parts of nickel and precipitated from a solution of nickel salt by means of sodium carbonate, are mixed while dry with 4 parts of finely subdivided nickel and treated with hydrogen in an autoclave at 60–70° C. for 15 hours, while stirring, under a pressure of 30–40 atmospheres. The reduced catalyst is preserved in water or other medium for the purpose of avoiding atmospheric oxidation and in this condition can be preserved for a long time.

*Example 3.*—205 parts of a mixture of kieselguhr and cobalt hydroxide which has been precipitated by means of sodium hydroxide from a solution of cobaltous chloride and contains 29.5 parts of cobalt is mixed with 1.2 parts of finely subdivided nickel and 2000 parts of alcohol, and then treated at about 100° C. and at 30 atmospheres pressure with hydrogen for 6 hours in an autoclave having a stirrer. The metal obtained can be preserved in water.

*Example 4.*—205 parts of a mixture of kieselguhr and copper carbonate, made by precipitating copper chloride solution by means of sodium carbonate and containing 21.8 parts of copper, are mixed with 1.3 parts of finely subdivided copper and 1000 parts of water; this mixture is treated with hydrogen in an autoclave having a stirrer for 6 hours at about 40° C. and under 20–30 atmospheres pressure.

What we claim is:—

1. A process of preparing metals suitable to act as catalysts, which process comprises reducing with hydrogen a reducible compound of such metals in the presence of a finely divided metal of the group consisting of nickel and copper as a catalyst at a temperature not considerably exceeding 100° C.

2. A process of preparing metals suitable to act as catalysts, which process comprises reducing with hydrogen a reducible compound of such metals in the presence of a finely divided metal of the group consisting of nickel and copper as a catalyst at a temperature not considerably exceeding 100° C. and in the presence of a carrier.

3. A process of preparing metals suitable to act as catalysts, which process comprises reducing with hydrogen a reducible compound of such metals in the presence of a finely divided metal of the group consisting of nickel and copper as a catalyst in a suspension medium under pressure at a temperature not considerably exceeding 100° C.

4. A process of preparing metals suitable to act as catalysts, which process comprises reducing with hydrogen under pressure an aqueous suspension of a reducible compound of such metals in the presence of a finely divided metal of the group consisting of nickel and copper as a catalyst at a temperature not considerably exceeding 100° C.

5. The process which comprises treating a mixture of kieselguhr and nickel carbonate in the presence of a nickel catalyst with hydrogen at a temperature of about 60 to about 70° C. under a pressure of 30 to 40 atmospheres.

6. The process which comprises treating a mixture of kieselguhr and copper carbonate in the presence of a nickel catalyst with hydrogen at a temperature of about 100° C. and under a pressure of about 40 atmospheres.

7. The process which comprises treating a mixture of kieselguhr and cobalt hydroxide in the presence of a nickel catalyst and a suspension medium with hydrogen at a temperature of about 100° C. and at a pressure of 30 atmospheres.

In testimony whereof, we affix our signatures.

KARL MARX.
HERMANN BEHNCKE.
HANS ZOBEL.